Patented Apr. 1, 1952

2,591,133

UNITED STATES PATENT OFFICE 2,591,133

METHOD OF PRODUCING GELATIN DERIVATIVE

Dan H. Campbell, Altadena, Joseph B. Koepfli, San Marino, and Linus Pauling, Sierra Madre Villa, Calif., assignors to California Institute Research Foundation, Pasadena, Calif., a corporation of California No Drawing. Application May 29, 1950, Serial No. 165,108

8 Claims. (Cl. 260—117)

This invention relates to a gelatin product and to a method of producing the same, which gelatin product is adapted to be used for transfusion in place of blood serum or human plasma. This application is a continuation-in-part of our copending application Serial No. 716,872 filed December 17, 1946, withdrawn after allowance in favor of this application.

An intense search has been made for substances that can be used for transfusion in place of human blood. Such materials as gum acacia, pectin and blood proteins from lower animals have been investigated but have proven unsatisfactory because of the possibility of tissue damage due to prolonged storage arising from the inability of the body to digest the protein, or because they produce allergic reaction upon repeated injections due to their antigenic properties. If gelatin solutions are carefully prepared they are non-antigenic and are readily digested by proteolytic enzymes present in the body tissues. Heretofore the chief objection to gelatin has been its tendency to gel at temperatures practical for injection. When the tendency of gelatin to gel is reduced by prolonged heating the molecular size is so reduced that when administered rapid leakage from the circulation occurs and the product is of little more value for transfusion than crystalloids.

The principal object of the present invention is to provide a gelatin product and process of producing the same, which gelatin product does not tend to gel at ordinary temperatures or temperatures practical for injection, and which gelatin product retains a sufficiently large molecular size to provide a desired osmotic pressure and thus avoid rapid leakage from the circulation.

Further objects of the present invention are to provide a product suitable for injection, which product is non-antigenic, non-toxic and non-pyrogenic, is readily digestible, and easily cleared from the tissues, and furthermore, is stable for long periods of time over a large range of storage and shipping conditions.

By means of the present invention we have produced a gelatin product which has the desired reduced gelling properties yet maintains a practical molecular size and homostatic pressure and possesses all the other required attributes of a blood plasma substitute. This product has been given the name oxypolygelatin. Oxypolygelatin is prepared by a process which consists in first condensing a gelatin solution by the addition of a polyfunctional coupling agent thereby coupling the gelatin molecules into larger complexes, or frameworks. Thus, for example, gelatin solutions of a molecular size of around 35,000 to 40,000 as determined by osmotic pressure are increased in molecular size to the order of around 100,000 to 200,000. Subsequent to the condensation of the gelatin the product is subjected to an oxidation, which oxidation reaction preferably proceeded simultaneously with a sterilizing treatment. The combined reaction of oxidation and heating results in a partial breakdown of the condensed gelatin molecule. For example, after oxidation and sterilization the molecular size of the finished product may be in the order of 30,000 to 35,000. The resulting product, while having a molecular weight closely corresponding to that of the original gelatin, is a more symmetrical molecule which does not tend to gel at ordinary temperatures. The oxidation changes the chemical and physical properties of the gelatin by increasing the number of ionizable carboxyl radicals thus lowering the isoelectric point of the protein and increasing the effective osmotic pressure at physiological conditions.

Where the original gelatin contains more than approximately 0.02% calcium we found it desirable to decalcify the gelatin. Large amounts of calcium in gelatin might confer some undesirable physiological properties but the principal reason for decalcifying the gelatin is due to the fact that the calcium ions influence the gelling properties of gelatin and oxypolygelatin. Any suitable method of decalcifying the gelatin may be employed but we have utilized such ion-exchange substances as Zeo Karb Na or Permutit. Other ion-exchange materials, such as Amberlite or Zeolite, may also be employed. In the decalcifying operation the ion-exchange substance is placed in a glass percolator and treated with saturated sodium chloride solution. After standing for several hours it is washed with distilled water until the washings are free of chloride ions and then warm gelatin solution allowed to filter through. It was found that on a laboratory scale 4 pounds of Zeo Karb Na in an 8 inch percolator was sufficient to remove the calicum from 30 liters of 7% solution when the gelatin contained approximately 0.4% calcium.

The condensation of the gelatin solution may be carried out with any number of bifunctional and polycoupling agents, such as carbon suboxide, formaldehyde, acetaldehyde, quinone and glyoxal, all of which have been tried in the process hereinafter described in further detail in substitution for glyoxal and proven useful. However, glyoxal is the preferred coupling agent since this reagent is simple, inexpensive and gives no by-product (except perhaps non-toxic traces of oxalate) which might be incompatible with transfusion. The condensation reaction between the coupling agent and gelatin takes place over a wide range of pH and temperature. It is preferred to terminate the condensation reaction before a irreversible gel is formed. To maintain a suitable high molecular size as well as to alter the shape of the gelatin molecule as much as possible an appreciable amount of the coupling agent should be allowed to react with the gelatin but the amount used should not produce a gel during treatment or leave an appreciable excess. Time, temperature, pH and concentration or reagents are controlled for the most part empirically. In most cases the gelatin solution condensed had a concentration of about 5%, this concentration being that desired in the final product to be used for transfusion. Higher concentrations, however, of the gelatin solution during condensation may be used but the increased difficulties due to higher viscosity and gel tendency would have been troublesome. In the process the maximum condensation of glyoxal which would react with the gelatin without producing a gel was selected. The particular amount varies not only with the condition described here but also the nature of the gelatin. In practice the amount of glyoxal for various gelatins ranged from 0.005 to 0.05 gram of glyoxal per gram of gelatin. The hydrogen ion concentration during condensation was maintained between pH 7.0 and 4.5. At higher pH values the condensation reaction was slower than the reaction of protein hydrolysis. The condensation reaction is accompanied by a fall in pH hence the reaction mixture was adjusted to neutrality after the addition of glyoxal and the pH was permitted to fall during the reaction.

A wide variety of temperatures may be employed in the condensation reaction, such as from 25° to 120° C., but at the lower temperatures the reaction is too slow to be practical. When the reaction is carried out in large batches at atmospheric pressure a temperature of around 95° C. was found preferable, although smaller samples were processed in autoclave at 120° C. During condensation the average molecular weight as determined by a measurement of osmotic pressure and viscosity, reaches a maximum at the end of about 50 minutes, and the reaction is preferably terminated. At this point, with continued heating, particularly when the pH has fallen to 5.0 or below, there results a reduction in the average molecular size of the gelatin. While in the preferred process glyoxal is employed as a coupling agent, each of the other coupling agents referred to have been used in the same process and found operative. Likewise, the concentration of a gelatin solution, although while it may vary, may range within the limits of about 1% to 25%.

The oxidation of the condensed gelatin may be carried out by such oxidizing agents as potassium permanganate but we have discovered that hydrogen peroxide not only has the desired effect of breaking down the condensed gelatin molecules but also has the property of destroying the pyrogens and is, therefore, a very valuable agent to employ in a process leading to the production of a solution to be injected. Furthermore, hydrogen peroxide forms no undesirable by-products which have to be removed from the solution before use. The practical range of concentration of hydrogen peroxide in the process was found to be between the limits of 0.01 to 0.02 gram of hydrogen peroxide per gram of gelatin. These concentrations were found sufficient to, at one time, insure the production of a pyrogenic free product and also to insure a sufficient breakdown of the condensed gelatin molecule so as to produce an oxypolygelation product which would remain liquid (without gelling) at temperatures as low as 15° C.

During oxidation is is desirable to control the acidity. It is, therefore, found preferable to adjust the pH before oxidation to 7.5 in order to avoid degradation during oxidation by acid hydrolysis. During oxidation the pH of the solution decreases to about 5.5 to 6 in the final product. It is found undesirable to attempt to hold the pH more alkaline, i. e. around 7 to 8, with the use of buffers, such as phosphate buffers, for the reasons that under such conditions the oxidation was generally too vigorous and the resulting product was degraded. The time allowed for oxidation reaction depends to some extent upon the hydrogen peroxide used and the room temperature. At room temperature, or even at 60° C., many hours were required for the completion of the oxidation of the condensed gelation to a state in which the preparation was liquid at room temperature. For practical reasons, therefore, oxidation is carried out during the final stages of bottling and sterilizing the preparation, which normally is conducted at a temperature of 120° C. for a period of 20 to 25 minutes.

Where it has been desired to produce a product which is isotonic sufficient salt (NaCl) is added to the solution just prior to the oxidation and sterilization step so as to approximate the salt concentration of the blood. This normally requires a salt concentration of 0.8 to 1.0, preferably 0.9%. There are, however, instances where a product is desired free of salt, in which case the salt content is omitted. Such product is not isotonic to necessitate injection into the circulatory system more slowly. In other instances it is possible to increase the gelatin concentration or add glucose in order to provide a substantially isotonic solution which omits salt. While the final product of the process normally has a pH of around 5.5 to 6 it takes only a slight amount of alkali to neutralize the product, which the blood stream is amply able to provide.

The following is an example of a preferred form of the process of the present invention carried out on a pilot-plant basis to provide about 400 bottles of 500 ml. each of the oxypolygelatin product. Approximately 16.00 kg. of Wilson gelatin (non-pyrogenic) was dissolved in 243 liters of distilled water contained in a 100-gallon glass-lined tank with a glass-coated agitator, and kept in constant motion. Solution of the gelatin was complete one hour after beginning the addition of the gelatin, during which time the temperature of the solution was maintained at 90° C. The volume of the solution was next made up to 312 liters to give a 5% gelatin concentration and the pH was raised from 4.5 to 6.82 by the addition of 840 ml. of 5 N NaOH. Thirty minutes later 489 ml. of 30.6% (w./v.) glyoxal was added along with 384 ml. of 1.0 N NaOH. This amount of glyoxal was equivalent to 0.01 g. per gram of gelatin. The additional NaOH was sufficient to neutralize the free acid in the glyoxal added. Fifty minutes after the addition of glyoxal, 2700 g. of NaCl and 504 ml. of 30% $H_2O_2$ (Technical, Baker) and 300 cc. of 1.0 N NaOH were added. The NaCl added was sufficient to give a 0.09% salt concentration, the $H_2O_2$ to give 0.01 g. per gram of gelatin, and the NaOH to neutralize the mixture at the start of the oxidation reaction. The mixture was then allowed to cool to 70° C. It was then passed through filters, bottled and autoclaved for 20 minutes at 120° C.

In the process of the present invention the gelatins used at the start of the process ordinarily had a molecular weight in the neighborhood of 35,000 to 40,000. Oxypolygelatin products produced ordinarily had a molecular weight in the neighborhood of 30,000 to 35,000. The polygelatins produced by the process of the present invention are liquid at room temperatures in 5% solution, whereas untreated gelatins of similar strength form firm gels at room temperature. Physiological experiments have been performed to evaluate the degree to which the modified gelatin or oxypolygelatin preparation may be retained in the circulatory system. In addition to studies of retention work has been carried out on the maintenance of plasma and blood volume, the blood pressure under conditions of exhaustive plasmaphoresis, lethal toxicity and pyrogenicity.

*Pyrogenicity.*—If the gelatin before treatment is definitely pyrogenic, the final modified gelatin or oxypolygelatin is definitely non-pyrogenic. The destruction of pyrogens occurs in the course of treatment by hydrogen peroxide.

*Lethal toxicity.*—Tests have indicated that the oxypolygelatin is non-toxic when injected intravenously, in greater than practical amounts, into mice, rabbits, dogs and humans.

*Maintenance of adequate blood pressure following experimental hemorrhage in rabbits.*—Tests indicated that replacement of blood by an equivalent amount of oxypolygelatin restored the blood pressure to a normal level.

*Retention as oxypolygelatin in circulation.*—Experimentation has indicated that oxypolygelatin as compared to ordinary gelatin was retained in the blood stream to the extent of 50–75% after a period of 5 to 6 hours, whereas a gelatin solution liquid at room temperature was practically eliminated from circulation under similar conditions.

*Relationship between retention in the bloodstream and molecular size.*—For a given molecular size, the retention in the bloodstream is much greater for oxypolygelatin than for ordinary gelatin. It is highly probable that this difference in behavior of oxypolygelatin and gelatin is due to a difference in the shape of the molecules. Gelatin molecules are considered to be long polypeptide chains, as represented graphically hereinbefore, with a diameter estimated to be 18 Å. These long thin molecules might well worm their way through the pores of the glomerular filter of the kidney, the effective diameter of which may be about 30 Å. On the other hand, oxypolygelatin molecules are, without doubt, branching chains rather than simple chains. The effect of glyoxal in coupling gelatin molecules together into aggregates would presumably be operative at random points along the gelatin molecules, and the subsequent hydrolysis and oxidation of the molecules would then result in oxypolygelatin molecules differing greatly in shape from gelatin molecules because of this branching. A branched molecule of oxypolygelatin might well have much greater difficulty in passing through the glomerular filter than the simple chain molecules of gelatin, thus resulting in the greater retention of oxypolygelatin than untreated gelatin of the same molecular weight.

Oxypolygelatin is digested and utilized in the body and does not accumulate and cause tissue damage as occurs with certain undigestible plasma substitutes.

In summation, a comparison is made between the criteria by which the usefulness of a blood substitute may be gauged as outlined by the Human Serum Association, and the properties of oxypolygelatin (quoted parts from the specifications set forth by the Human Serum Association):

"The material must have stability under a variety of conditions: It must be a retainable colloid of high osmotic activity and low viscosity."

The oxypolygelatin solutions are stable; they are liquid at ordinary temperatures, and do not need to be heated before injection; they have low viscosity; they are retained long enough in the bloodstream to permit the organism to make readjustment to a stress. They have fairly high osmotic activity, and the material is cleared easily from the system, preventing the occurrence of reactions resulting from the persistence of large molecules.

"The solution must be safe to inject in large doses into patients who are in a critical condition. It must be retained in the circulation in order to be effective. The solution must not interfere with blood coagulation, defense against infection, tissue repair, nor with the function of the internal organs."

Oxypolygelatin is indicated to be safe for injection by the results obtained with rabbits and other animals, and also by the results of injections in humans carried out at the Los Angeles County General Hospital and the White Memorial Hospital in Los Angeles. As much as one liter a day for three consecutive days has been given intravenously without producing any untoward effects. Oxypolygelatin preparations are uniformly non-pyrogenic; evidence has been obtained indicating that autoclaving with hydrogen peroxide destroys pyrogens. No observations have been made which suggest any effect of oxpolygelatin on the normal clotting mechanism of the blood, or on the mechanism of defense against infection or tissue repair, or with the function of the internal organs. Some temporary deposition of oxypolygelation in the proximal tubules of the kidney has been reported; the amount of this deposition is not significantly different from that observed for gelatin or foreign serum proteins. Oxypolygelatin, like any colloidal material may increase the rate of sedimentation of erythrocytes under certain conditions.

"If a foreign substance is used it should be of such nature that there is a minimum of natural sensitivity to it. Furthermore, it should be a poor antigen . . ."

A striking property of gelatin is its non-antigenicity; this property is shown also by oxypolygelatin.

Oxypolygelatin can be manufactured cheaply and in large quantities. It would be more economical to manufacture oxypolygelatin than autoclaved gelatin for transfusions, because of the fact that the effect of hydrogen peroxide is to destroy pyrogens. Oxypolygelatin can be made to suit different conditions by slight alteration in the chemical treatment; variation in the amount of glyoxal, which causes condensation, the amount of hydrogen peroxide, which increases the colloid osmotic effect and decreases the gelling tendency, and the amount of autoclaving, which causes hydrolysis, can be made to produce the material desired. An important practical advantage of oxypolygelatin over gelatin having similar physiological properties is that oxypolygelatin is a liquid at room temperature, and does not need to be warmed before injection, and that relatively crude gelatin can be used as a starting material. No unsatisfactory behavior of oxypolygelatin as a plasma substitute has yet been observed.

Not only is the oxypolygelatin a satisfactory substitute for blood plasma but by reason of the fact that it may be safely introduced into the body in large quantities, it may be employed as a vehicle for the introduction of many medicines and foods, for example, antibiotics (e. g., penicillin), insulin, glucose, or protein hydrolysates containing essential amino acids.

Various changes and alternate arrangements may be made within the scope of the appended claims, in which it is my intention to claim all novelty inherent in the invention as broadly as the prior art permits.

We claim:

1. A method of manufacturing a gelatin product, which comprises condensing a gelatin solution in water by the addition of a condensation agent selected from the group consisting of carbon suboxide, formaldehyde, acetaldehyde, quinone and glyoxal, terminating the condensation before an irreversible gel has formed, oxidizing the condensed gelatin by the addition of hydrogen peroxide, adding salt to a concentration of approximately 0.9% and adjusting the pH to approximately 7.

2. A method of preparing a gelatin product as in claim 1 in which the gelatin contains less than 0.02% calcium.

3. A method of manufacturing a gelatin product as in claim 1 in which the gelatin solution has a concentration of between 1 and 25%.

4. A method of manufacturing a gelatin product as in claim 1 in which the gelatin contains less than 0.02% of calcium and in which the gelatin solution has a concentration of between 1 and 25%.

5. A method of manufacturing a gelatin product which comprises condensing a gelatin solution in water by the addition of glyoxal in amounts between 0.005 to 0.05 part by weight of glyoxal per parts by weight of gelatin while maintaining the pH of the gelatin solution between 7.0 and 4.5, and thereafter oxidizing the glyoxal-treated gelatin by hydrogen peroxide while maintaining the pH between 7.5 and 5.5, the amount of hydrogen peroxide employed being between 0.01 to 0.02 part by weight of hydrogen peroxide to parts by weight of gelatin.

6. A method of preparing a gelatin product as in claim 5 in which the oxidation of the glyoxal-treated gelatin is carried out simultaneously with a sterilization treatment.

7. A method of manufacturing a gelatin product which comprises condensing a gelatin solution in water by the addition of glyoxal in the amounts between 0.005 to 0.05 part by weight of glyoxal per parts by weight of gelatin while maintaining the pH of the gelatin solution between 7.0 and 4.5, and thereafter oxidizing the glyoxal-treated gelatin by hydrogen peroxide while maintaining the pH between 7.5 and 5.5 to reduce the molecular weight as determined by osmotic pressure to not below 30,000.

8. A method of manufacturing a gelatin product which comprises condensing a gelatin solution in water by the addition of glyoxal in the amounts between 0.005 to 0.05 part by weight of glyoxal per parts by weight of gelatin while maintaining the pH of the gelatin solution between 7.0 and 4.5, and thereafter oxidizing the glyoxal-treated gelatin by hydrogen peroxide while maintaining the pH between 7.5 and 5.5 to reduce the molecular weight as determined by osmotic pressure to not below 30,000, the amount of hydrogen peroxide employed being between 0.01 to 0.02 part by weight of hydrogen peroxide to parts by weight of gelatin.

DAN H. CAMPBELL.
JOSEPH B. KOEPFLI.
LINUS PAULING.

No references cited.